United States Patent
Chung et al.

(10) Patent No.: US 12,382,496 B2
(45) Date of Patent: Aug. 5, 2025

(54) UNSLOTTED CSMACA OPTIMIZATION METHOD AND DEVICES IN Wi-SUN USING REINFORCEMENT LEARNING

(71) Applicant: Pusan National University Industry-University Cooperation Foundation, Busan (KR)

(72) Inventors: Sanghwa Chung, Busan (KR); Sihyeon Lee, Busan (KR)

(73) Assignee: PUSAN NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 511 days.

(21) Appl. No.: 17/874,942

(22) Filed: Jul. 27, 2022

(65) Prior Publication Data

US 2023/0156794 A1  May 18, 2023

(30) Foreign Application Priority Data

Nov. 17, 2021  (KR) .................. 10-2021-0158160

(51) Int. Cl.
 *H04W 74/0816*  (2024.01)
 *H04W 24/02*  (2009.01)
(52) U.S. Cl.
 CPC ....... *H04W 74/0816* (2013.01); *H04W 24/02* (2013.01)
(58) Field of Classification Search
 CPC .................. H04W 74/0816; H04W 24/02
 See application file for complete search history.

(56) References Cited

U.S. PATENT DOCUMENTS

| | | | | |
|---|---|---|---|---|
| 2018/0124688 A1* | 5/2018 | Thubert | ............... | H04W 24/02 |
| 2024/0135231 A1* | 4/2024 | Naik | ..................... | G06N 20/00 |

FOREIGN PATENT DOCUMENTS

| | | | |
|---|---|---|---|
| KR | 10-2009-0012427 A | | 2/2009 |
| KR | 10-2009-0050913 A | | 5/2009 |
| KR | 10-2009-0113139 A | | 10/2009 |

OTHER PUBLICATIONS

Lee, et al. "Unslotted CSMA/CA mechanism with reinforcement learning of Wi-SUN MAC layer" ICUFN Jul. 5-8, 2022 (Year: 2022).*

(Continued)

*Primary Examiner* — Basil Ma
(74) *Attorney, Agent, or Firm* — Paratus Law Group, PLLC

(57) ABSTRACT

An unslotted CSMA/CA optimization device includes a variable initializing unit performing variable initialization used in an algorithm for unslotted CSMA/CA optimization; an exploration and exploitation selecting unit determining exploration/exploitation using an epsilon greedy algorithm; an action selecting unit selecting an action having the best Q-value, among actions, when exploitation is selected, and randomly selecting an action when exploration is selected; a channel information collecting unit executing backoff when an action (backoff time) is selected, repeatedly executing CCA during the backoff time, and counting the number of times a channel is idle and the number of times the channel is busy; a success rewarding unit transmitting a packet when the channel is idle and rewarding success when acknowledge (Ack) is received; and a Q-table updating unit checking the received reward and updating a Q-table based on an action, a state, and a reward.

16 Claims, 7 Drawing Sheets

(56) References Cited

OTHER PUBLICATIONS

Chen, et al. "Study of Contention Window Adjustment for CSMA/CA by using Machine Learning" APNOMS Sep. 8-10, 2021 (Year: 2021).*

Aihara et al. "Q-Learning Aided Resource Allocation and Environment Recognition in LoRaWAN with CSMA/CA" IEEE Access Oct. 17, 2019 (Year: 2019).*

* cited by examiner

FIG. 4

| | | | | | | | | | | | | | | Wasted | Backoff |
|---|---|---|---|---|---|---|---|---|---|---|---|---|---|---|---|
| A | RX | RX |  | RX | RX | RX | RX |  |  |  | RX | RX | | | |
| B | TX | TX | | | | | | | | | | | | | |
| C | CCA | | | TX | TX | | | | | | | | | | |
| D | | CCA | | CCA | | | CCA | | | | TX | TX | | | |
| E | CCA | | | | | TX | TX | | | | | | | | |

FIG. 5

| | | | | | | | | | | | | | | Backoff |
|---|---|---|---|---|---|---|---|---|---|---|---|---|---|---|
| A | RX | RX | RX | RX | RX | RX | RX | RX | | | | | | |
| B | TX | TX | | | | | | | | | | | | |
| C | CCA | | TX | TX | | | | | | | | | | |
| D | | CCA | | | | TX | TX | | | | | | | |
| E | CCA | | | TX | TX | | | | | | | | | |

UNSLOTTED CSMACA OPTIMIZATION METHOD AND DEVICES IN Wi-SUN USING REINFORCEMENT LEARNING

CROSS-REFERENCE TO RELATED APPLICATION

This application claims priority to Korean Patent Application No. 10-2021-0158160 (filed on Nov. 17, 2021), which is hereby incorporated by reference in its entirety.

BACKGROUND

The present disclosure relates to an industrial wireless network, and more particularly to an unslotted CSMA/CA optimization device and method in a wireless smart utility network (Wi-SUN) using reinforcement learning, enabling optimization of unslotted CSMA/CA which is a channel access method of the IEEE 802.15.4 Wi-SUN MAC by learning unslotted CSMA/CA parameters of each node through reinforcement learning.

Wi-SUN is an international wireless communications standard. Compared to other low power wide area (LPWA), Wi-SUN has high reliability of switching routes by automatically monitoring radio wave conditions through multi-hop communications, without incurring communication cost.

Therefore, Wi-SUN is attracting attention as communications technology that may build a large-scale mesh network necessary for the realization of smart cities and smart grids. A MAC layer of Wi-SUN adopts unslotted CSMA/CA to access channels.

FIG. 1 is an unslotted CSMA/CA algorithm of IEEE 802.15.4.

A node that wants to transmit a packet may obtain an authority to access a channel through the unslotted CSMA/CA algorithm before accessing the channel, and transmit the packet. Each transmission node randomly selects a backoff value in the range of $[0, 2^{BE}-1]$ from a transmission time and delays transmission by a corresponding period.

Thereafter, the node performs channel clear access (CCA) to determine whether the channel to be accessed is in an idle state.

If the channel is idle, the node may be granted an authority to access the channel and may transmit packets. If the channel is not idle, the node may increase a BE value, determines a backoff value randomly within a wider range to reattempt CCA, and may repeat until a maximum reattempt chance is reached.

Although the world's trend towards the Internet of Things is clear, the growing number of nodes gradually adversely affects network performance.

CSMA/CA, a wireless channel access method used to improve network performance, is a method to avoid packet collisions between different nodes, but packet collisions still occur. This is intensified as the number of competing nodes increases, sharply reducing network efficiency.

In addition, despite the fact that Wi-SUN is a communications standard targeting smart cities and smart grids in which dozens or hundreds of nodes are connected in a wide area, Wi-SUN adopts unslotted CSMA/CA as a channel approach, and thus performance degradation due to collisions in dense nodes is inevitable.

TSCH, another MAC protocol of 802.15.4, ensures low delay, high reliability, and contention-free transmission and reception by scheduling packet transmission.

Meanwhile, wireless nodes of Wi-SUN are mostly sensor nodes, and although the sensor nodes periodically generate traffic at regular intervals, it is difficult to introduce a time-dependent scheduling method in Wi-SUN that does not adopt the TDMA method.

Unslotted CSMA/CA has parameters such as in Table 1.

TABLE 1

| Parameter | Allowed values |8| |
|---|---|
| macMaxFrameRetries | Range: 0-7 (Default: 3) |
| macMaxCSMABackoffs | Range: 0-5 (Default: 4) |
| macMaxBE | Range: 3-8 (Default: 5) |
| macMinBE | Range: 0-7 (Default: 3) |

Although there are studies showing that performance is increased if these parameters are appropriately adjusted, progress of research on appropriate parameter values in a specific environment or research on adaptively changing parameters according to network conditions by adjusting these parameters more dynamically is incomplete.

The problems of the unslotted CSMA/CA backoff method of the related art are as follows.

FIG. 2 is a block diagram illustrating an operation of a backoff algorithm in the related art.

First, channel resources are wasted.

In the unslotted CSMA/CA method, scheduling between nodes is not possible because the algorithm operates when each node wants to transmit. Therefore, there is unused time when considering channel usage efficiency in the entire network.

FIG. 3 shows a star topology, and FIG. 4 is a diagram of a channel resource waste problem.

Also, FIG. 5 is a diagram in the case of an optimized backoff.

Child nodes B, C, D, and E under parent node A transmit to node A only through one channel, and it is assumed that there is no hidden terminal problem.

Node B transmits to node A after backoff first, and the nodes C and E perform backoff and CCA to transmit to Node A.

Since node B is using the channel, nodes C and E perform backoff again, and node D also performs backoff after CCA for the same reason. In this process, the red field of node A was not used and wasted.

Second is an increase in latency.

CSMA/CA checks whether a channel is idle through CCA before accessing the channel.

If the channel is not idle, a BE value may be increased and backoff may be selected in a wider range, so an unnecessarily high backoff value may be selected. This is one of the factors that increase packet latency.

For example, referring to node D of FIG. 4, 10 spaces are consumed to obtain a transmission opportunity, but after optimization as shown in FIG. 7, a transmission opportunity is obtained in only 6 spaces. Similarly, nodes C and E are reduced from 3 and 5 spaces to 2 and 4 spaces, respectively.

Such an example is only an example when there are 4 child nodes, and in Wi-SUN, which is intended to connect dozens to hundreds of nodes, this phenomenon is even worse.

In order to completely solve the problem, time synchronization between nodes is required.

Like slotted (beacon enabled) CSMA/CA, in order to be synchronized and operated by beacon, a packet for synchronization called beacon should be added, which has a problem of adding additional load to the network.

Therefore, there is a need for the development of a new technology that may optimize the CSMA/CA operation without additional packets required for synchronization between nodes, such as beacons.

RELATED ART DOCUMENT

Patent Document (Patent document 1): Korean Patent Laid-Open Publication No. 10-2009-0012427
(Patent document 2): Korean Patent Laid-Open Publication No. 10-2009-0050913
(Patent document 1): Korean Patent Laid-Open Publication No. 10-2009-0113139

SUMMARY

The present disclosure provides an unslotted CSMA/CA optimization device and method in a wireless smart utility network (Wi-SUN) using reinforcement learning, enabling optimization of unslotted CSMA/CA which is a channel access method of the IEEE 802.15.4 Wi-SUN MAC by learning unslotted CSMA/CA parameters of each node through reinforcement learning.

The present disclosure also provides an unslotted CSMA/CA optimization device and method in a Wi-SUN using reinforcement learning, enabling adaptively optimizing according to a network situation by selecting appropriate backoff through reinforcement learning for an unslotted CSMA/CA which is a channel access method of a Wi-SUN MAC layer which is an IEEE 802.15.4 standard technology.

The present disclosure also provides an unslotted CSMA/CA optimization device and method in a Wi-SUN using reinforcement learning, capable of measuring a usage rate of a channel to be accessed by continuing channel clear access (CCA) during a backoff period of each node, enabling an agent of reinforcement learning to directly select an appropriate backoff time to improve the efficiency of a MAC layer.

The present disclosure also provides an unslotted CSMA/CA optimization device and method in a Wi-SUN using reinforcement learning, which allow each node to be trained without additional packet exchange between nodes in a wireless network, thereby increasing overall performance without adding overall network overhead.

The present disclosure also provides an unslotted CSMA/CA optimization device and method in a Wi-SUN using reinforcement learning, in which each node selects an appropriate backoff value after learning to use a channel more efficiently and latency of packets is optimized and decreased, so that a network channel waste and packet latency are minimized after learning.

The present disclosure also provides an unslotted CSMA/CA optimization device and method in a Wi-SUN using reinforcement learning, enabling efficient channel use so that the number of times each node performs TX is reduced, thereby reducing energy used for TX.

Other objects of the present disclosure are not limited to the aforementioned objects, and other objects not mentioned will be clearly understood by those skilled in the art from the following description.

In an aspect, an unslotted CSMA/CA optimization device in a Wi-SUN using reinforcement learning includes: a variable initializing unit performing variable initialization used in an algorithm for unslotted CSMA/CA optimization; an exploration and exploitation selecting unit determining exploration/exploitation using an epsilon greedy algorithm; an action selecting unit selecting an action having the best Q-value, among actions, when exploitation is selected, and randomly selecting an action when exploration is selected; a channel information collecting unit executing backoff when an action (backoff time) is selected, repeatedly executing CCA during the backoff time, and counting the number of times a channel is idle and the number of times the channel is busy; a success rewarding unit transmitting a packet when the channel is idle and rewarding success when acknowledge (Ack) is received; and a Q-table updating unit checking the received reward and updating a Q-table based on an action, a state, and a reward.

In another aspect, an unslotted CSMA/CA optimization method in a Wi-SUN using reinforcement learning includes: a variable initializing operation of performing variable initialization used in an algorithm for unslotted CSMA/CA optimization; an exploration and utilization selecting operation of determining exploration/exploitation using an epsilon greedy algorithm; an action selecting operation of selecting an action having the best Q-value, among actions, when exploitation is selected, and randomly selecting an action when exploration is selected; a channel information collecting operation of executing backoff when an action (backoff time) is selected, repeatedly executing CCA during the backoff time, and counting the number of times a channel is idle and the number of times the channel is busy; a success rewarding operation of transmitting a packet when the channel is idle and rewarding success when acknowledge (Ack) is received; and a Q-table updating operation of checking the received reward and updating a Q-table based on an action, a state, and a reward.

As described above, the unslotted CSMA/CA optimization device and method in a wireless smart utility network (Wi-SUN) using reinforcement learning according to the present disclosure have the following effects.

First, the unslotted CSMA/CA parameters of each node are learned through reinforcement learning to enable the optimization of unslotted CSMA/CA, which is a channel access method of the IEEE 802.15.4 Wi-SUN MAC.

Second, adaptively optimization may be adaptively performed according to a network situation by selecting appropriate backoff through reinforcement learning for an unslotted CSMA/CA which is a channel access method of a Wi-SUN MAC layer which is an IEEE 802.15.4 standard technology.

Third, it is possible to increase a usage rate of a channel to be accessed by continuing CCA during a backoff period of each node, and an agent of reinforcement learning is enabled to directly select an appropriate backoff time to improve the efficiency of a MAC layer.

Fourth, each node is trained without additional packet exchange between nodes in a wireless network, thereby increasing overall performance without adding overall network overhead.

Fifth, each node selects an appropriate backoff value after learning to use a channel more efficiently and latency of packets is optimized and decreased, so that a network channel waste and packet latency are minimized after learning.

Sixth, a channel is efficiently is used so that the number of times each node performs TX is reduced, thereby reducing energy used for TX.

BRIEF DESCRIPTION OF THE DRAWINGS

FIG. 4 is an example of a channel resource waste problem.

FIG. 5 is a diagram in the case of an optimized backoff.

DETAILED DESCRIPTION

Hereinafter, an embodiment of an unslotted CSMA/CA optimization device and method in a wireless smart utility network (Wi-SUN) using reinforcement learning according to the present disclosure will be described in detail.

Features and advantages of the unslotted CSMA/CA optimization device and method in a Wi-SUN using reinforcement learning according to the present disclosure will become apparent through a detailed description of each embodiment below.

Figure 1:
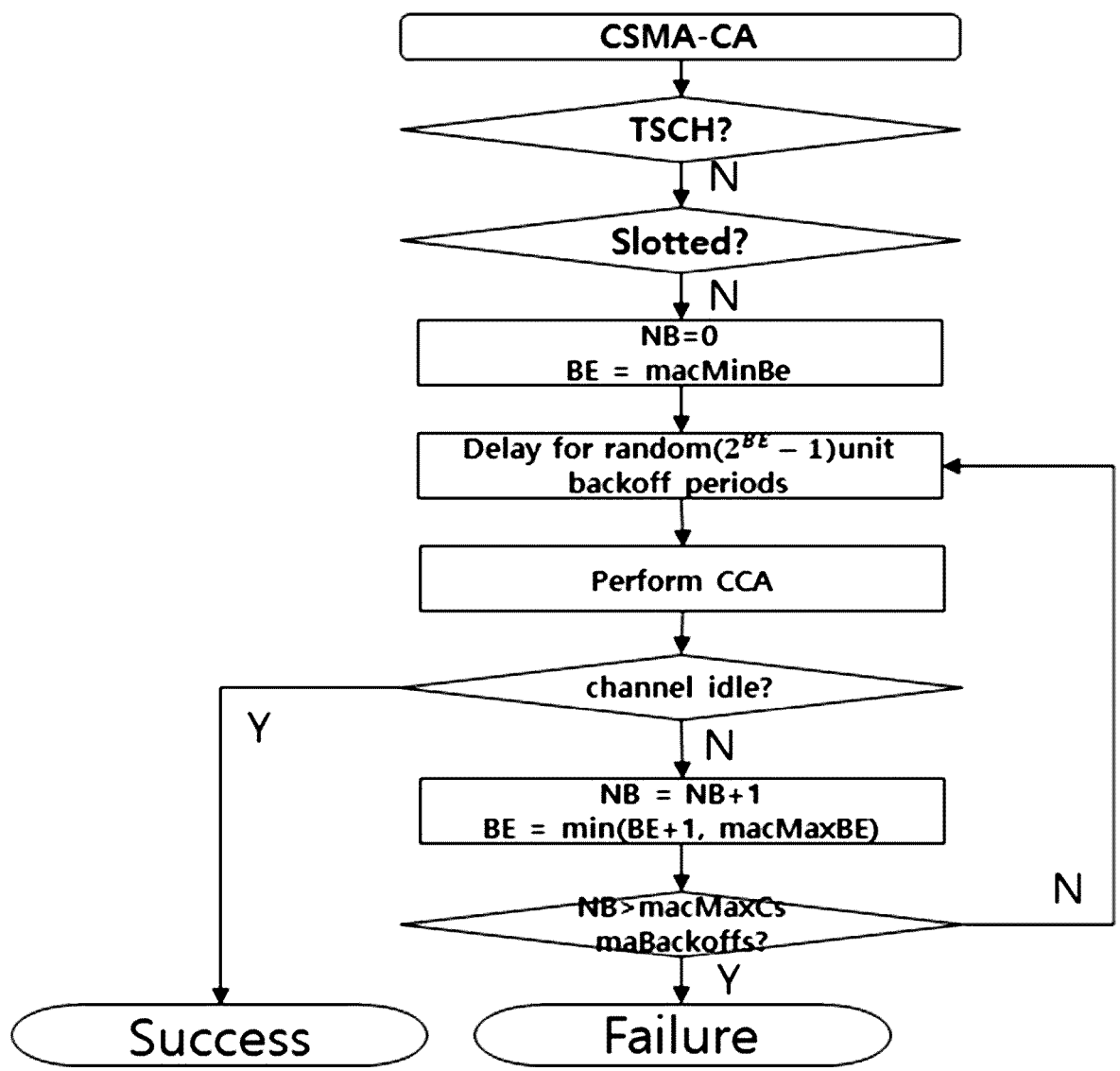
FIG. 1 is a flowchart of an unslotted CSMA/CA algorithm of the IEEE 802.15.4.
Figure 2:
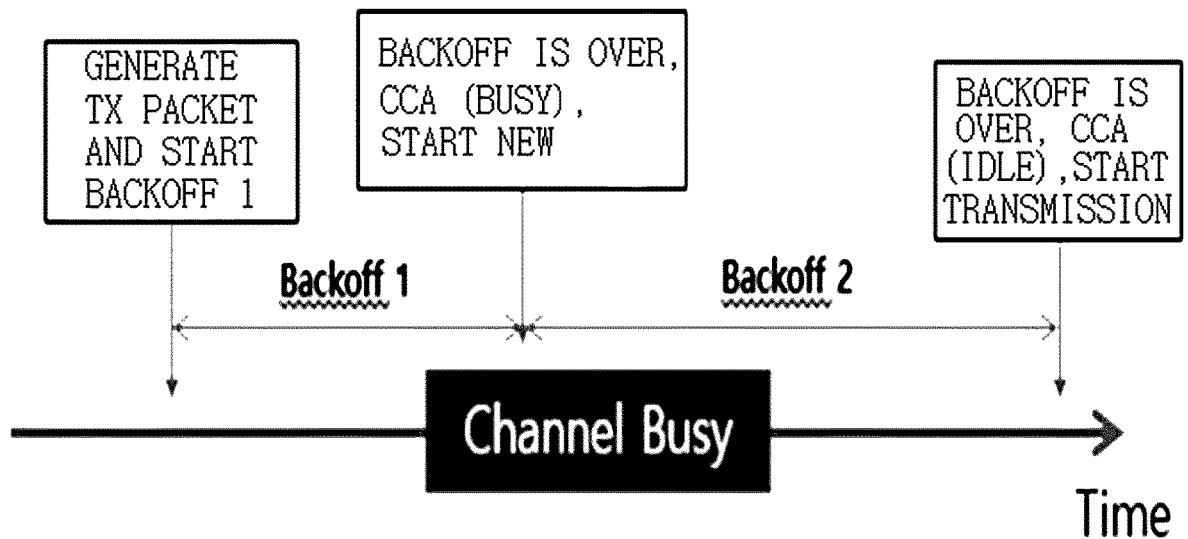
FIG. 2 is a block diagram showing an operation of a backoff algorithm in the related art.
Figure 3:
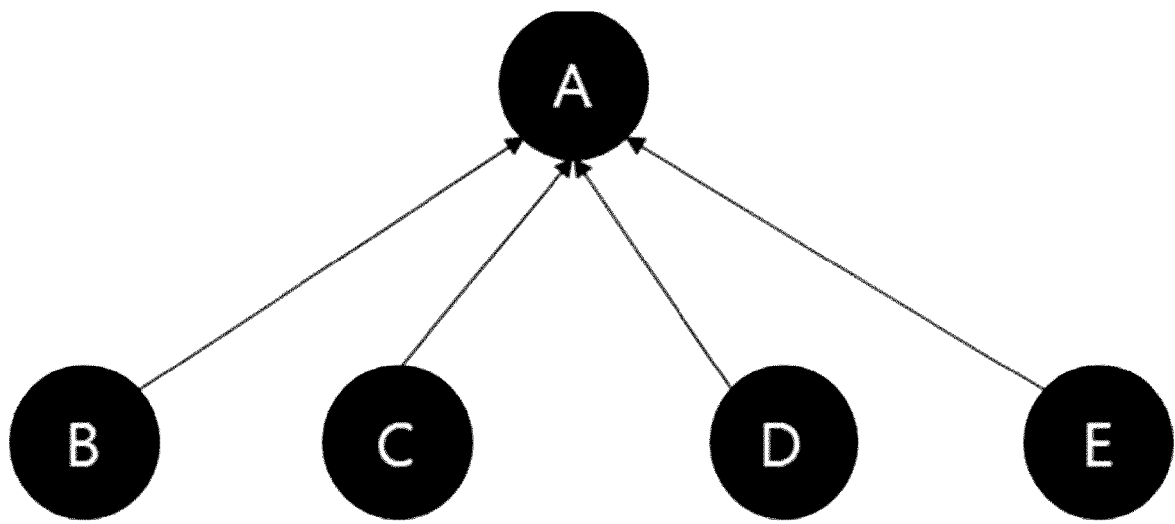
FIG. 3 is a star topology.
Figure 6:
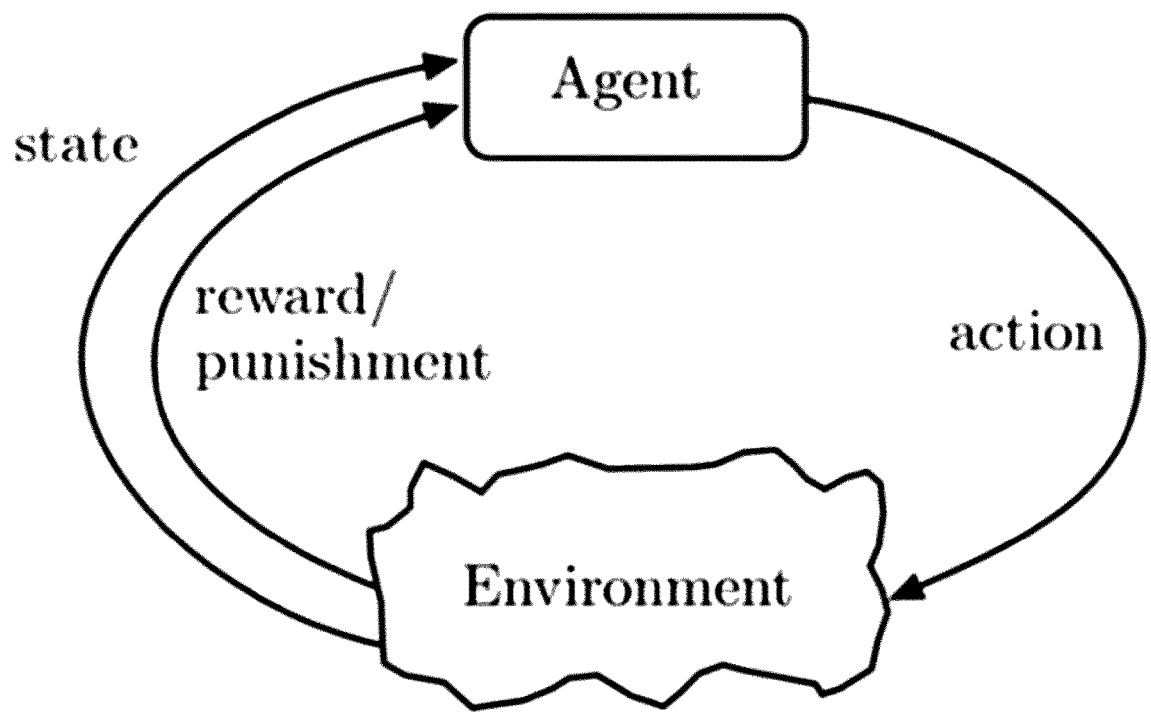
FIG. 6 is a diagram showing an example of a reinforcement learning model applied to the present disclosure.
Figure 7:
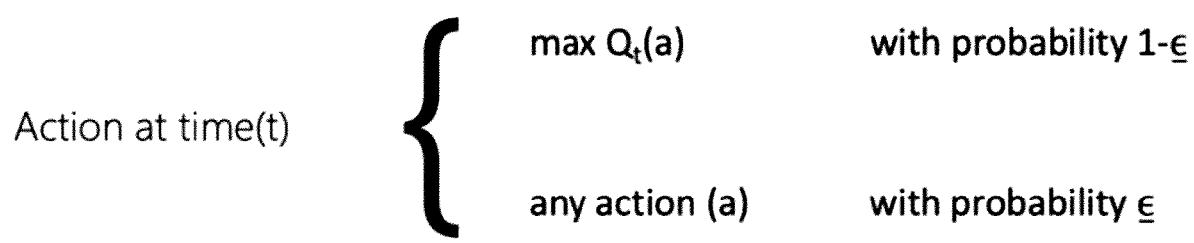
FIG. 7 is a diagram illustrating the epsilon-greedy algorithm.

FIG. 6 is a diagram illustrating an example of a reinforcement learning model applied to the present disclosure, and FIG. 7 is a diagram illustrating an epsilon-greedy algorithm.

The unslotted CSMA/CA optimization device and method in a Wi-SUN using reinforcement learning according to the present disclosure enables optimization of unslotted CSMA/CA which is a channel access method of the IEEE 802.15.4 Wi-SUN MAC by learning unslotted CSMA/CA parameters of each node through reinforcement learning.

To this end, the present disclosure may include a configuration for adaptively optimizing according to a network situation by selecting appropriate backoff through reinforcement learning for an unslotted CSMA/CA which is a channel access method of a Wi-SUN MAC layer which is an IEEE 802.15.4 standard technology.

The present disclosure may include a configuration for measuring a usage rate of a channel to be accessed by continuing channel clear access (CCA) during a backoff period of each node, enabling an agent of reinforcement learning to directly select an appropriate backoff time to improve the efficiency of a MAC layer.

Reinforcement learning is one of the artificial intelligence-based machine learning algorithms that combines the Markov decision process (MDP)-based optimization concept with the animal psychology concept (trial-and-error), and a lot of research and development has been conducted to solve a system optimization problem.

In addition, in reinforcement learning, an agent configures a reward function using data derived from an environment based on a simulation or system environment that is in charge of and participates in all system environment information, and iteratively improves the reward function to achieve an optimal goal.

To this end, as shown in FIG. 6, the agent should perform an organic process of changing a plurality of environmental states derived from an environment, controlling an action of the agent, designing a system reward function, improving policy, and deriving an optimization model, and a good learning effect may be obtained only when learning indicators such as environmental state definition, action decision, reward function and policy design are well combined and operated.

In particular, reinforcement learning is a machine learning method that may be used in a wireless network field because it may be trained by reflecting a dynamic situation of a wireless network.

The elements of reinforcement learning include policy, reward, value function, environment, and agent. The policy defines how an agent's action is determined, and the reward is an evaluation of the agent's action from the environment. The value function is a value of the sum of the depreciation of the rewards that the agent may receive later in a specific state. In general, the policy is set in a direction that maximizes this value function.

Q-learning to be used in the present disclosure is an off-policy algorithm based on a temporal-difference (TD) model.

Unlike the value function V(s) that stores rewards only for the agent's state(s), Q(s,a) stores the rewards by reflecting the agent's state and action as well.

The Q(s,a) value is updated by Equations 1 and 2 and has a policy of selecting an action to maximize the reward through a Q-Table of Q(s,a).

$$\Delta Q(s,a) = \{r(s,a) + \beta \times \max_a Q(s',a')\} - Q(s,a) \quad \text{[Equation 1]}$$

$$Q(s,a) = (1-\alpha) \times Q(s,a) + \alpha \times \Delta Q(s,a) \quad \text{[Equation 2]}$$

Here, there are two methods of selecting an action: Exploitation and Exploration.

Since a better policy cannot be found only by taking an action that maximizes the Q-value, the epsilon-greedy algorithm is used to find a policy with a better reward by making a new attempt with a certain probability.

According to FIG. 7, a random action is selected by a probability of ε, and an action that maximizes the Q-value is selected by a probability of 1−ε.

Figure 8:
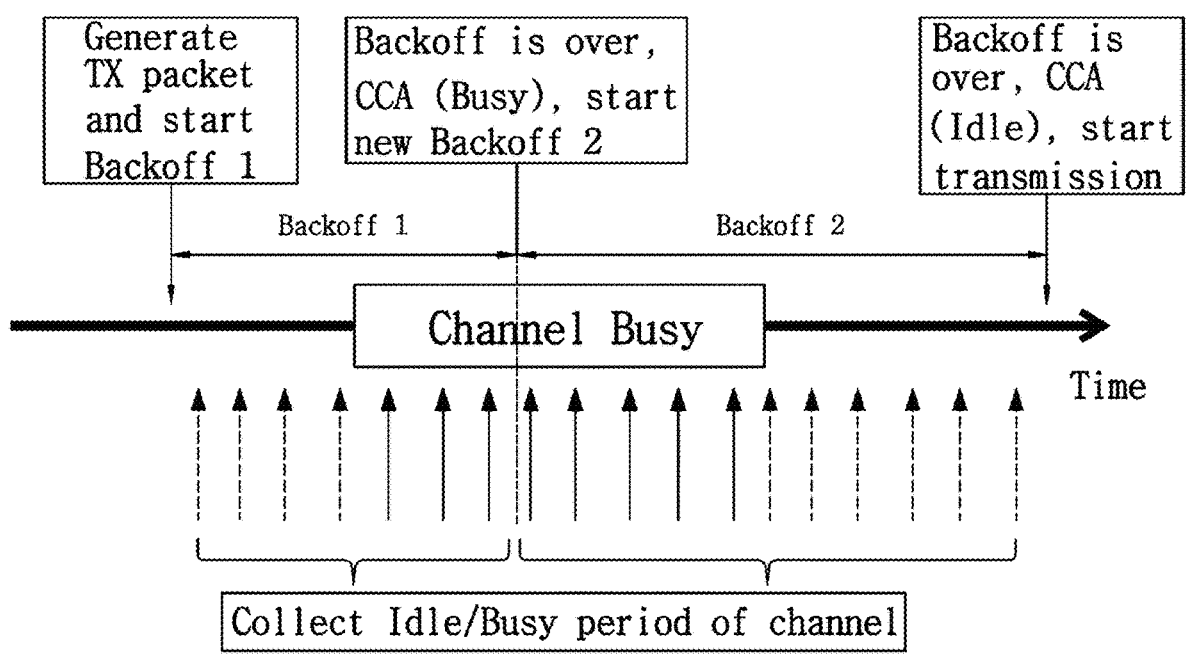
FIG. 8 is a diagram showing an operation of a backoff algorithm according to the present disclosure.

FIG. 8 is a diagram showing an operation of the backoff algorithm according to the present disclosure.

The present disclosure relates to a method of adaptively optimizing according to a network situation by selecting appropriate backoff through reinforcement learning for an unslotted CSMA/CA which is a channel access method of a Wi-SUN MAC layer which is an IEEE 802.15.4 standard technology.

Each CSMA/CA-applied node operates the radio in a sleep state during a backoff period, and operates the CCA by operating the radio again when the backoff period is over. In the present disclosure, the CCA is continued during the backoff period of each node to measure a usage rate of a channel to be accessed.

As shown in FIG. 8, in the present disclosure, the CCA of the radio, rather than the sleep state, is continued during the backoff period of the node. The blue arrow means that the channel is idle when CCA is performed at the corresponding time, and the red arrow means that the channel is busy.

A unit backoff period, which is a unit of backoff, is as shown in Equation 3, and it is possible because the unit backoff period includes the CCA time. Therefore, it is possible to measure how long the channel is idle through continuous CCA during the backoff period of the node.

$$\text{aUnitBackoffPeriod} = \text{aTurnaroundTime} + \text{phyCcaDuration} \quad \text{[Equation 3]}$$

Here, aUnitBackoffPeriod is a unit time of the backoff period, aTurnaroundTime is a time required for the device to switch to RX-to-TX or TX-to-RX, and phyCcaDuration is a time required for CCA.

Figure 9:
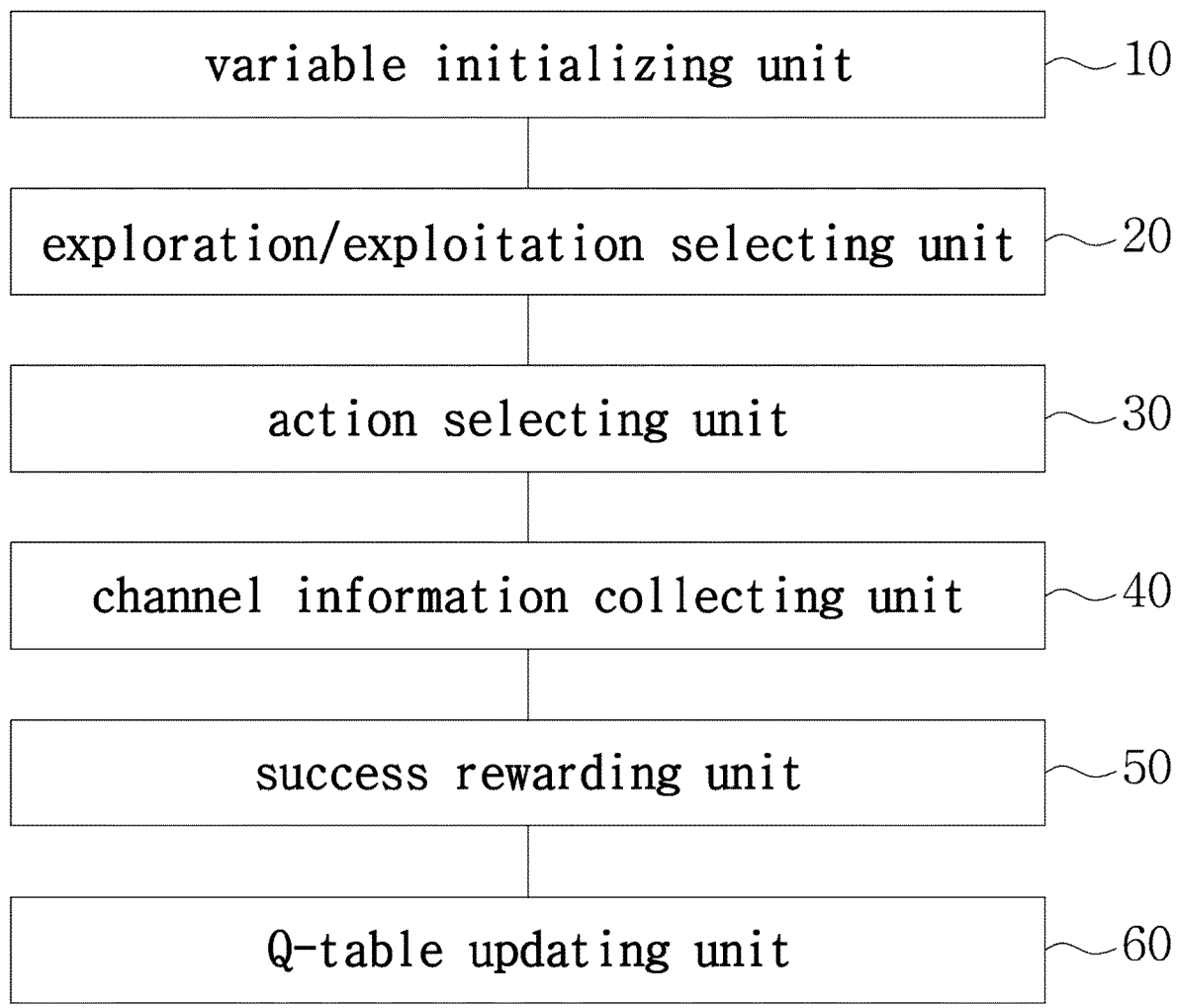
FIG. 9 is a diagram of an unslotted CSMA/CA optimization device method in a wireless smart utility network (Wi-SUN) using reinforcement learning according to the present disclosure.

FIG. 9 is a diagram of an unslotted CSMA/CA optimization device method in a Wi-SUN using reinforcement learning according to the present disclosure.

As shown in FIG. 9, an unslotted CSMA/CA optimization device in a Wi-SUN using reinforcement learning according to the present disclosure includes a variable initializing unit 10 performing variable initialization used in an algorithm for unslotted CSMA/CA optimization, an exploration and exploitation selecting unit 20 determining exploration/exploitation using an epsilon greedy algorithm, an action selecting unit 30 selecting an action having the best Q-value, among actions, when exploitation is selected, and randomly selecting an action when exploration is selected, a channel information collecting unit 40 executing backoff when an action (backoff time) is selected, repeatedly executing CCA during the backoff time, and counting the number of times a channel is idle and the number of times the channel is busy, a success rewarding unit 50 transmitting a packet when the channel is idle and rewarding success when acknowledge (Ack) is received, and a Q-table updating unit 60 checking the received reward and updating a Q-table based on an action, a state, and a reward.

Here, the exploration and exploitation selecting unit 20 obtains and selects an Epsilon value at random (values 0 to 1), for example, if ε=0.2, exploitation is selected with a probability of 80% and exploration is selected with a probability of 20%.

When the backoff time is over, CCA is executed once, it is checked whether the channel is busy or idle, a packet is transmitted when the channel is idle, and it waits for an Ack timeout time.

When Ack is received, the success rewarding unit gives a success reward $R_1$ because the transmission is successful, and when Ack is not received or when the number of backoff is exceeded, the success rewarding unit gives a failure reward $R_2$.

Also, when the channel is busy in the operation of checking whether the channel is busy or idle by the channel information collecting unit 40, related variables are updated to perform unslotted CSMA/CA again.

Also, when NB (the number of current backoff attempts) is greater than a MAX value set in the CSMA algorithm, no more attempts is made and a failure reward is received.

Also, in the case of a situation where backoff can be performed additionally, reward $R_3$ is received, reward and the Q-table are updated, and then reattempt is performed.

Figure 10:
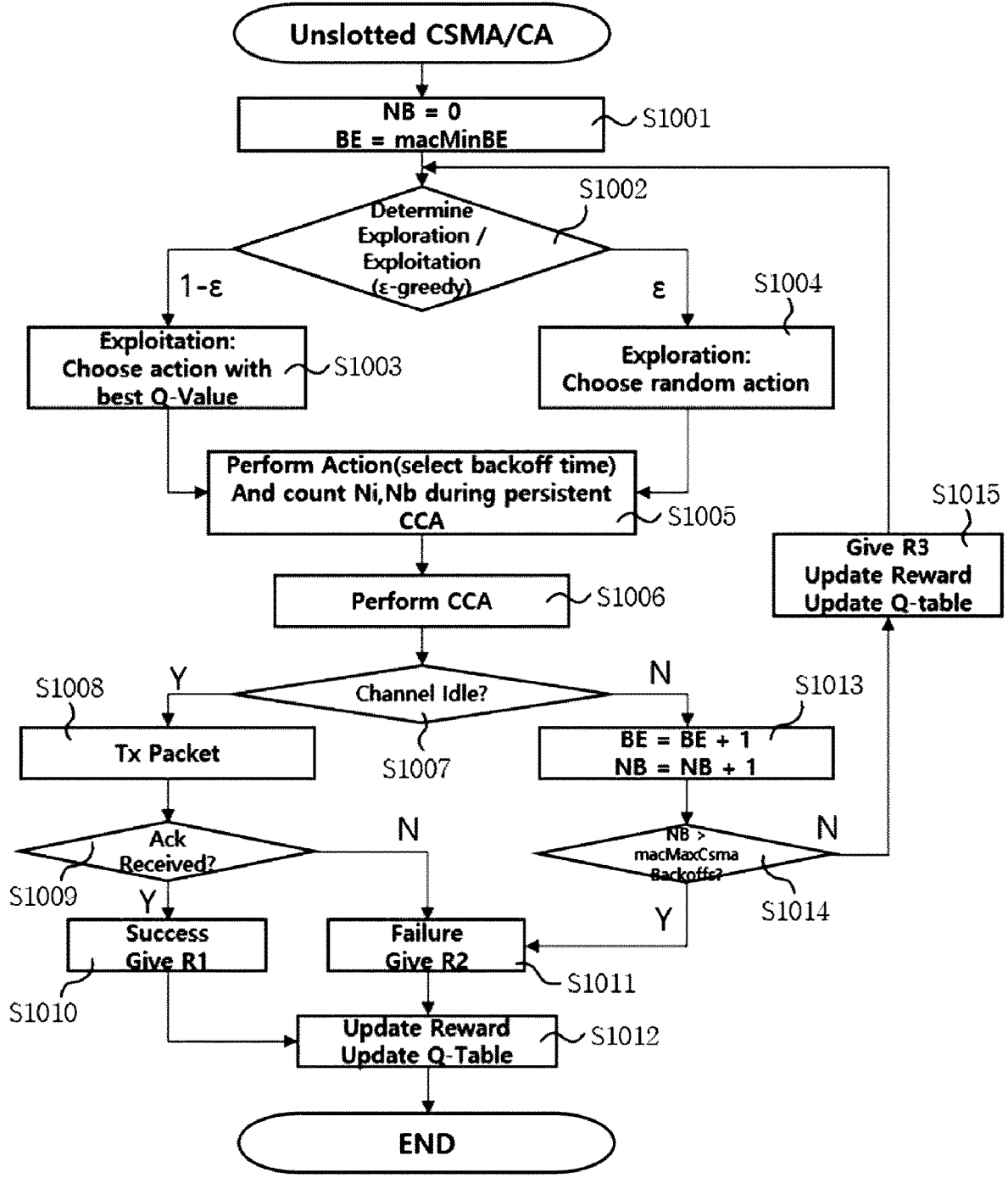
FIG. 10 is a flowchart illustrating an unslotted CSMA/CA optimization method in a wireless smart utility network (Wi-SUN) using reinforcement learning according to the present disclosure.

FIG. 10 is a flowchart illustrating an unslotted CSMA/CA optimization method in a Wi-SUN using reinforcement learning according to the present invention.

First, the variable initializing unit 10 initializes a variable used in an algorithm for unslotted CSMA/CA optimization (S1001).

Next, the exploration and exploitation selecting unit 20 determines exploration/exploitation by using the epsilon greedy algorithm (S1002).

The epsilon value is randomly obtained and selected (values of 0 to 1). For example, if £=0.2, and exploitation is selected with a probability of 80% and exploration is selected with a probability of 20%.

Also, when exploitation is selected by the action selecting unit 30, an action having the best Q-Value is selected among the actions (S1003), and when exploration is selected, an action is randomly selected (S1004).

Then, when an action (backoff time) is selected, the backoff is executed, but CCA is repeatedly executed during the backoff time, and the channel information collection unit 40 counts the number of idle times and busy times of the channel during the backoff time (S1005).

Also, when the backoff time is over, the CCA is executed once (S1006).

Thereafter, it is checked whether the channel is busy or idle (S1007), and if the channel is idle, a packet is transmitted (S1008), and it waits for an Ack timeout time (S1009).

Also if the Ack is received, since the transmission is successful, the success rewarding unit 50 gives a success reward $R_1$ (S1010).

If the Ack is not received, a failure reward $R_2$ is given or when the number of backoffs is exceeded, $R_2$ is also given (S1011).

Next, the received reward is checked, and since the process is finished, the Q-table updating unit 60 updates the Q-table based on the action, state, and reward (S1012).

If the channel is busy in the operation of checking whether the channel is busy or idle (S1007), related variables are updated to perform unslotted CSMA/CA once again (S1013).

If NB (the number of current backoff attempts) is greater than a MAX value set in the CSMA algorithm, no more attempts may be made, so the operation moves to step S1011 and a failure reward is received (S1014).

Also, if it is possible to perform additional backoff, reward $R_3$ is received, the reward and the Q-table are updated, and then reattempt is made (S1015).

A method for unslotted CSMA/CA optimization will be described in more detail as follows.

As unslotted CSMA/CA algorithm to which Q-learning is applied, Q-learning has the following actions, states, and rewards.

The action was previously [0, $2^{BE}-1$], but in order to give the agent an autonomous choice, [0, $63(2^6-1)$] using 6, which is a maximum value of MacMaxBE in Table 1, is used as the BE value.

That is, when selecting an action, each agent sets a random value among [0, $2^{BE}-1$] as the backoff time with a probability of ε and selects an action with the highest Q by referring to the Q-Table with a probability of 1-ε.

A state is determined by the accumulation of Ni and Nb. Ni and Nb are the number of channel idle and channel busy, respectively, and are values calculated when continuous CCA is performed in FIG. 8.

For this value, each agent (each node) accumulates and uses channel usage rate information as shown in Equations 4 and 5 below at a timing when it transmits packets.

$$macIdleSum = macIdleSum/2 + Ni/2 \qquad \text{[Equation 4]}$$

$$macBusySum = macBusySum/2 + Nb/2 \qquad \text{[Equation 5]}$$

Here, Ni is the number of idle times of the channel measured from CCA performed during backoff time, Nb is the number of channel busy times measured from CCA performed during backoff time, macIdleSum is the number of channel idle times updated and maintained through Ni in the device, and macBusySum is the number of channel busy times updated and maintained through Nb in the device.

Q-learning determines an action by referring to the Q-Table of state and action, so the number of states and actions affects performance.

If Equation 4 is set to see the channel usage, the number of states including a decimal point becomes very large, so a result value of Equation 6 is rounded up and used.

Therefore, the state has a total of 11 states from 0 to 10. As a result, a size of Q-Table is action(64)*state(11).

$$\text{round}\left(\frac{macIdleSum}{macIdleSum + maxBusySum}\right) \times 10 \quad \text{[Equation 6]}$$

The rewards that the agent receives are classified into 4 categories.

First, a case in which the agent selects action (backoff), transmits a packet as the channel is idle at the time of backoff, and receives ACK, Second, a case in which the agent selects action (backoff), and transmits a packet as the channel is idle at the time of backoff, but does not receive ACK, Third, a case in which the agent selects action (backoff) and should select action in a next state as the channel is busy at the time of backoff, and Fourth a case in which a channel access fails by exhausting all backoff opportunities in spite of the fact that the agent continuously performs the third case.

The first case is defined as $R_1$, the second and fourth cases are defined as $R_2$, and the third case is defined as $R_3$.

$$R_1 = 1 - \frac{N_i}{N_b + N_i} \times N_{backoff} \times \frac{1}{D} \quad \text{[Equation 7]}$$

$$R_2 = -1 - \frac{N_i}{N_b + N_i} \times N_{backoff} \times \frac{1}{D} \quad \text{[Equation 8]}$$

$$R_3 = 0 - \frac{N_i}{N_b + N_i} \times N_{backoff} \times \frac{1}{D} \quad \text{[Equation 9]}$$

Here, $N_{backoff}$ is a backoff period selected by the device, D is a division number for reward normalization and regulation of latency.

The (−1, 0, 1) value given before a common formula is a reward for each (transmission failure, channel busy situation, transmission success).

The commonly applied $$-\frac{N_i}{N_b + N_i} \times N_{backoff} \times \frac{1}{D}$$

is a formula to give a penalty when the agent selects an unnecessarily high backoff, in which $$\frac{N_i}{N_b + N_i}$$

is an indicator of how long the channel is idle.

The variable D is a hyper parameter for how much penalty is to be given to latency. That is, an overall value of the corresponding formula increases as the value D decreases, and a value of the corresponding formula decreases as the value D increases.

Due to this common formula, a higher penalty is imposed as the agent selects a high backoff value even though there were many situation in which the channel is idle, and the degree of the penalty is adjusted to the value D.

For example, if the value D is large, the penalty for latency is small and the node receives a higher reward for successfully transmitting a packet than the latency, which increases the probability of success even though latency increases.

By combining these two equations, the agent may receive a higher reward as the transmission succeeds and the less wasteful backoff is selected as an action.

The unslotted CSMA/CA optimization device and method in a wireless smart utility network (Wi-SUN) using reinforcement learning, enable adaptively optimizing according to a network situation by selecting appropriate backoff through reinforcement learning for an unslotted CSMA/CA which is a channel access method of a Wi-SUN MAC layer which is an IEEE 802.15.4 standard technology.

It will be understood that the present disclosure may be implemented in modified forms without departing from the spirit and scope of the present disclosure.

Therefore, the embodiments disclosed herein should be considered in an illustrative aspect rather than a restrictive aspect, and the scope of the present disclosure is shown in the claims rather than the foregoing description, and all differences within the equivalent range should be interpreted as being included in the present disclosure.

What is claimed is:

1. An unslotted CSMA/CA optimization device in a wireless smart utility network (Wi-SUN) using reinforcement learning, the unslotted CSMA/CA optimization device comprising:

a variable initializing unit performing variable initialization used in an algorithm for unslotted CSMA/CA optimization;

an exploration and exploitation selecting unit determining exploration/exploitation using an epsilon greedy algorithm;

an action selecting unit selecting an action having a best Q-value, among actions, when exploitation is selected, and randomly selecting an action when exploration is selected;

a channel information collecting unit executing backoff when an action (backoff time) is selected, repeatedly executing channel clear access (CCA) during the backoff time, and counting a number of times a channel is idle and a number of times the channel is busy;

a success rewarding unit transmitting a packet when the channel is idle and rewarding success when acknowledge (Ack) is received; and a Q-table updating unit checking the received reward and updating a Q-table based on an action, a state, and a reward, wherein, a state is determined by an accumulation of Ni (the number of channel idle) and Nb (the number of channel busy) and is a value calculated when continuous CCA is performed, and each agent (each node) obtains usage information of a channel at a timing for transmitting a packet as macIdleSum=macIdleSum/2+Ni/2 and macBusySum=macBusySum/2+Nb/2, wherein Ni is the number of idle times of the channel measured from CCA performed during backoff time, Nb is the number of channel busy times measured from CCA performed during backoff time, macIdleSum is the number of channel idle times updated and maintained through Ni in the device, and macBusySum is the number of channel busy times updated and maintained through Nb in the device, and wherein the state has a total of 11 states from 0 to 10, and a size of the Q-Table is action(64)*state(11), and is defined as $$\text{round}\left(\frac{macIdleSum}{macIdleSum + macBusySum}\right) \times 10.$$

2. The unslotted CSMA/CA optimization device of claim 1, wherein, when the backoff time is over, CCA is executed once, it is checked whether the channel is busy or idle, a packet is transmitted when the channel is idle, and it waits for an Ack timeout time.

3. The unslotted CSMA/CA optimization device of claim 1, wherein, when Ack is received, the success rewarding unit gives a success reward $R_1$ because the transmission is successful, and when Ack is not received or when the number of backoff is exceeded, the success rewarding unit gives a failure reward $R_2$.

4. The unslotted CSMA/CA optimization device of claim 3, wherein, when NB (the number of current backoff attempts) is greater than a MAX value set in the CSMA algorithm, no more attempts is made and a failure reward is received, and in a case of a situation where backoff can be performed additionally, reward $R_3$ is received, reward and the Q-table are updated, and then a reattempt is performed.

5. The unslotted CSMA/CA optimization device of claim 1, wherein, when the channel is busy in the operation of checking whether the channel is busy or idle by the channel information collecting unit, related variables are updated to perform unslotted CSMA/CA again.

6. An unslotted CSMA/CA optimization method in a wireless smart utility network (Wi-SUN) using reinforcement learning, the unslotted CSMA/CA optimization method comprising:
- a variable initializing operation of performing variable initialization used in an algorithm for unslotted CSMA/CA optimization;
- an exploration and utilization selecting operation of determining exploration/exploitation using an epsilon greedy algorithm;
- an action selecting operation of selecting an action having a best Q-value, among actions, when exploitation is selected, and randomly selecting an action when exploration is selected;
- a channel information collecting operation of executing backoff when an action (backoff time) is selected, repeatedly executing channel clear access (CCA) during the backoff time, and counting the number of times a channel is idle and the number of times the channel is busy;
- a success rewarding operation of transmitting a packet when the channel is idle and rewarding success when acknowledge (Ack) is received; and
- a Q-table updating operation of checking the received reward and updating a Q-table based on an action, a state, and a reward, wherein a state is determined by an accumulation of Ni (the number of channel idle) and Nb (the number of channel busy) and is a value calculated when continuous CCA is performed, and each agent (each node) obtains usage information of a channel at a timing for transmitting a packet as MacIdleSum=macIdleSum/2+Ni/2 and macBusySum=macBusySum/2+Nb/2, wherein Ni is the number of idle times of the channel measured from CCA performed during backoff time, Nb is the number of channel busy times measured from CCA performed during backoff time, macIdleSum is the number of channel idle times updated and maintained through Ni in an unslotted CSMA/CA optimization device, and macBusySum is the number of channel busy times updated and maintained through Nb in the device, and wherein the state has a total of 11 states from 0 to 10, and a size of the Q-Table is action(64)*state(11), and is defined as $$\text{round}\left(\frac{macIdleSum}{macIdleSum + macBusySum}\right) \times 10.$$

7. The unslotted CSMA/CA optimization method of claim 6, wherein CCA, rather than a sleep state, is continued during a backoff period, a unit backoff period, which is a unit of backoff, is defined as aUnitBackoffPeriod=aTurnaroundTime+phyCcaDuration, wherein aUnitBackoffPeriod is a unit time of the backoff period, aTurnaroundTime is a time required for the device to switch to RX-to-TX or TX-to-RX, phyCcaDuration is a time required for CCA, and the unit Backoff period includes a CCA time so that how long the channel is idle is measured through continuous CCA during the backoff period.

8. The unslotted CSMA/CA optimization method of claim 6, wherein, when selecting an action, a random value among $[0, 2^{BE}-1]$ is set as a Backoff time with a probability of $\varepsilon$, and an action having a highest Q is selected by referring to the Q-Table with a probability of $1-\varepsilon$.

9. The unslotted CSMA/CA optimization method of claim 6, wherein
the reward that the agent receives is classified into
(A) a case in which the agent selects action (backoff), transmits a packet as the channel is idle at the time of backoff, and receives ACK,
(B) a case in which the agent selects action (backoff), and transmits a packet as the channel is idle at the time of backoff, but does not receive ACK,
(C) a case in which the agent selects action (backoff) and should select action in a next state as the channel is busy at the time of backoff, and
(D) a case in which a channel access fails by exhausting all backoff opportunities in spite of the agent continuously performing the case of (C),
wherein the case of (A) is defined as $R_1$, the cases of (B) and (D) are defined as $R_2$, and the case of (C) is defined as $R_3$.

10. The unslotted CSMA/CA optimization method of claim 9, wherein
each reward is defined as $$R_1 = 1 - \frac{N_i}{N_b + N_i} \times N_{backoff} \times \frac{1}{D},$$

$$R_2 = -1 - \frac{N_i}{N_b + N_i} \times N_{backoff} \times \frac{1}{D},$$

$$R_3 = 0 - \frac{N_i}{N_b + N_i} \times N_{backoff} \times \frac{1}{D},$$

wherein $N_{backoff}$ is a backoff period selected by the device, D is a division number for reward normalization and regulation of latency, the $(-1, 0, 1)$ value given before a common formula is a reward for each (transmission failure, channel busy situation, transmission success).

11. The unslotted CSMA/CA optimization method of claim 10, wherein the common formula $$-\frac{N_i}{N_b + N_i} \times N_{backoff} \times \frac{1}{D}$$

is a formula to give a penalty when the agent selects an unnecessarily high backoff, in which $$\frac{N_i}{N_b + N_i}$$

is an indicator of how long the channel is idle.

12. The unslotted CSMA/CA optimization method of claim 11, wherein D is a hyper parameter for how much penalty is to be given to latency, an overall value of a corresponding formula increases as D decreases, a value of the corresponding formula decreases as D increases, and due to the common formula, a higher penalty is imposed as the agent selects a high backoff value even though there were many situation in which the channel is idle, and a degree of the penalty is adjusted to D.

13. The unslotted CSMA/CA optimization method of claim 6, wherein, when the backoff time is over, CCA is executed once, it is checked whether the channel is busy or idle, a packet is transmitted when the channel is idle, and it waits for an Ack timeout time.

14. The unslotted CSMA/CA optimization method of claim 6, wherein, when NB (the number of current backoff attempts) is greater than a MAX value set in the CSMA algorithm, no more attempts is made and a failure reward is received, and in a case of a situation where backoff can be performed additionally, reward $R_3$ is received, reward and the Q-table are updated, and then a reattempt is performed.

15. The unslotted CSMA/CA optimization method of claim 6, wherein, when the channel is busy in the operation of checking whether the channel is busy or idle, related variables are updated to perform unslotted CSMA/CA again.

16. An unslotted CSMA/CA optimization method in a wireless smart utility network (Wi-SUN) using reinforcement learning, the unslotted CSMA/CA optimization method comprising:
a variable initializing operation of performing variable initialization used in an algorithm for unslotted CSMA/CA optimization;
an exploration and utilization selecting operation of determining exploration/exploitation using an epsilon greedy algorithm;
an action selecting operation of selecting an action having a best Q-value, among actions, when exploitation is selected, and randomly selecting an action when exploration is selected;
a channel information collecting operation of executing backoff when an action (backoff time) is selected, repeatedly executing channel clear access (CCA) during the backoff time, and counting the number of times a channel is idle and the number of times the channel is busy;
a success rewarding operation of transmitting a packet when the channel is idle and rewarding success when acknowledge (Ack) is received; and
a Q-table updating operation of checking the received reward and updating a Q-table based on an action, a state, and a reward,
wherein a state is determined by an accumulation of Ni (the number of channel idle) and Nb (the number of channel busy) and is a value calculated when continuous CCA is performed, and
wherein the state has a total of 11 states from 0 to 10, and a size of the Q-table is action(64)*state(11), and is defined as $$\text{round}\left(\frac{macIdleSum}{macIdleSum + macBusySum}\right) \times 10.$$

* * * * *